E. L. HARMER.
HITCHING DEVICE.
APPLICATION FILED APR. 9, 1908.

931,419.

Patented Aug. 17, 1909.

WITNESSES:
Grayce Holmes
C. E. Nape

INVENTOR.
Everett L. Harmer
BY
James T. Watson
his ATTORNEY.

UNITED STATES PATENT OFFICE.

EVERETT L. HARMER, OF BRAINERD, MINNESOTA, ASSIGNOR OF ONE-HALF TO SWAN JOHNSON, OF BRAINERD, MINNESOTA.

HITCHING DEVICE.

No. 931,419.  Specification of Letters Patent.  Patented Aug. 17, 1909.

Application filed April 9, 1908. Serial No. 426,077.

*To all whom it may concern:*

Be it known that I, EVERETT L. HARMER, a citizen of the United States, residing at Brainerd, in the county of Crow Wing and State of Minnesota, have invented certain new and useful Improvements in Hitching Devices; and I do hereby declare the following to be a full, clear, and exact description of the invention, such as will enable others skilled in the art to which it appertains to make and use the same.

My invention relates to hitching devices for horses or other draft animals and has for its object the provision of a convenient means for anchoring the animals at a station, whereby the use of anchoring weights and stationary hitching posts may be avoided.

It consists of the constructions, combinations and arrangements of parts hereinafter described and claimed.

Figure 1:
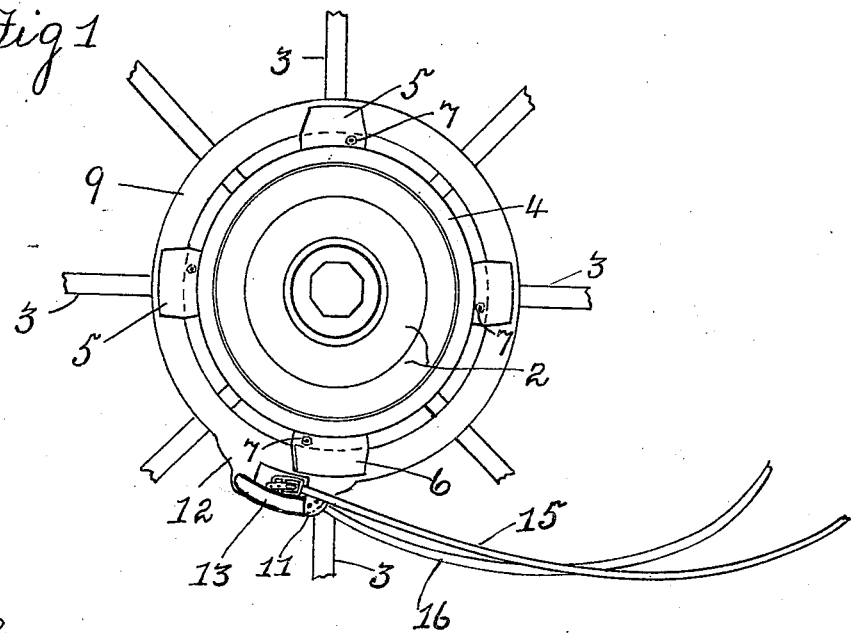
Figure 2:
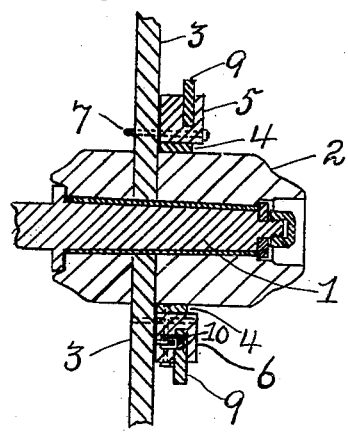
Figure 3:
Figure 4:
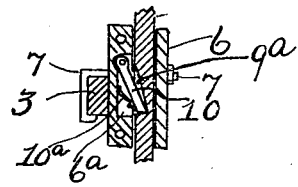
Figure 5:
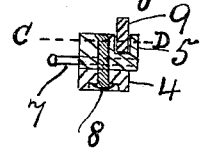
Figure 7:
Figure 6:
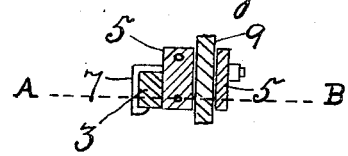

In the drawings, Figure 1 is a fragmentary side elevation of a vehicle wheel, showing my invention mounted thereon. Fig. 2 is a central vertical transverse section through the same. Fig. 3 is a perspective view of a slotted portion, hereinafter described, of the stationary rim forming part of said invention. Fig. 4 is a central horizontal section of a portion of a loose ring, hereinafter described, and of a dog block and ring-engaging dog, forming part of said invention. Fig. 5 is a vertical transverse section of a guide block, on the line A—B, of Fig. 6. Fig. 6 is a horizontal section of a guide block on the line C—D of Fig. 5. Fig. 7 is a vertical transverse section on the line E—F of Fig. 3.

In the drawings, 1 is an axle of a vehicle, and 2 is the hub of one of the wheels thereof, which axle and hub may be of any suitable construction. 3, 3 are spokes of said wheel, which spokes may be of any suitable construction. 4 is a rim mounted on said hub outward of said spokes and secured in position by one or more segmental guide blocks 5, 5, 5, and a segmental combined guide and dog block 6, which blocks are riveted or bolted to said rim and are secured respectively to said adjoining spokes by hook-bolts 7, 7, extending through said blocks and engaging said spokes, the rivets or bolts as 8, which secure some of said blocks to said rim are preferably passed through slotted apertures as $4^a$ formed in said rim, so that said blocks may be moved circumferentially of said rim in either direction to bring them into proper position with relation to the spokes; but the dog block is preferably secured rigidly to the rim and the whole rim is adjusted so as to bring the dog block into proper position with relation to the spoke to which it is to be locked by one or more of said hook-bolts. Said dog block, and each of said guide blocks, is longitudinally grooved in its peripheral face to receive a ring 9, which ring is loosely mounted in said grooves so as to be free to rotate around said hub except as hereinafter described. In said dog block is found a recess $6^a$ opening into said groove in said block, in which recess is positioned a dog 10, of any suitable construction, adapted in operation to be projected by a back spring $10^a$ into an indent $9^a$ formed in said ring,—the back wall of said indent being inclined so as to operate as a cam to force said dog out of said indent against the resistance of said spring when said wheel is rotating backwardly. Upon the periphery of said ring are formed radially directed posts 11 and 12, the space between the outer ends of which is normally closed by a spring-gate 13, secured at one end to one of said posts and adapted to overlap the other of said posts. Said posts and the portion of the ring between them and said gate taken together thus form the walls of an eye through which may be passed the connected ends of the driving reins 15 and 16, or if desired, said reins may be separated at the driver's end and knots tied therein to prevent the extreme ends thereof from slipping through said eye, and said reins may then be passed intermediate of their ends between the free end of said gate and the contiguous said post and thus secured in said eye; or buttons similar to driving buttons may be secured to the ends of said reins instead of said knots, and for a similar purpose, as will be readily understood by those skilled in the art.

The free end of the dog, in the dog box, should be so positioned that it will be directed rearwardly when it is below the hub. If desired, however, the dog may be mounted on the ring and adapted to engage a recess in the dog box. Said arrangement will, it is thought, be readily understood by those skilled in the art without further description.

In operation, the driver upon leaving the vehicle, will engage the driving reins with said eye. Should the animal now move ahead, thus causing the rotation of the wheel forwardly, the dog will engage the indent thus causing the ring to move with the wheel around its axis resulting in the drawing back and winding up of the reins around the hub and checking the animal. Should the animal start to back, thus causing the reversing of the wheel, the reins will be unwound from the hub and if the backing is continued the dog will disengage from said indent and the wheel will continue to turn without turning said ring. Upon returning to the vehicle, the driver disengages said reins from said eye by drawing them against the free end of the spring thus causing the spring gate to open and release the reins. If desired, a special tie strap or rein may be used for the hitching purpose instead of the driving reins.

It is apparent that the device may be made in rights or lefts for application respectively to right or left hand wheels, and it may be secured to either the front or rear wheels as desired. It may also be made with interchangeable parts so that it may be used either for right or left wheels.

It is obvious that said construction may within the scope of certain of my claims be modified in many respects, and may be made in various sizes and proportions and forms.

What I claim is:

1. The combination of a vehicle wheel, a rim loosely encircling the hub of said wheel, guide blocks secured to said rim, hooks for securing said blocks to the spokes of said wheel, said blocks being grooved in their peripheral faces, a ring encircling said hub and engaged by said grooves, and means for limiting the rotation of said ring contrary to the forward rotation of said wheel.

2. The combination of a vehicle wheel, a rim encircling the hub of said wheel, guide blocks secured to said rim, some of said guide blocks being adjustably secured to said rim, said guide blocks being secured to said wheel, a ring encircling said hub and loosely engaged by said guide blocks, and means for limiting the rotation of said ring contrary to the rotation of said wheel.

3. The combination of a vehicle wheel, a rim encircling the hub of said wheel, guide blocks secured to said rim, hooks embracing the spokes of said wheel and engaging said blocks, a ring encircling said hub and of larger diameter than said rim, said ring being loosely engaged by said guide blocks, posts formed on said ring and adapted to receive a rein between them and a spring secured to the outer end of one of said posts and adapted at its free end to overlap the outer end of the other of said posts.

In testimony whereof I hereunto affix my signature, in presence of two witnesses.

EVERETT L. HARMER.

Witnesses:
 M. E. RYAN,
 SWAN JOHNSON.